United States Patent [19]

Hunter

[11] 3,882,998

[45] May 13, 1975

[54] ROTARY FEEDER APPARATUS

[76] Inventor: George T. Hunter, 512 Avon, Pontiac, Mich. 48053

[22] Filed: Sept. 10, 1973

[21] Appl. No.: 395,645

[52] U.S. Cl. ................ 198/287; 198/288; 221/167
[51] Int. Cl. .......................................... B65g 47/24
[58] Field of Search ........... 198/33 AA, 33 R, 22 R, 198/25, 209, 287, 288; 221/167, 168

[56] References Cited
UNITED STATES PATENTS

| | | |
|---|---|---|
| 3,277,996 | 10/1966 | Thurston et al. ............... 198/33 AA |
| 3,282,464 | 11/1966 | Kohl et al. ..................... 198/33 AA |
| 3,392,816 | 7/1968 | Cox ................................ 198/33 AA |
| 3,414,112 | 12/1968 | Ravn .............................. 198/33 AA |
| 3,674,128 | 7/1972 | Mead ............................. 198/33 AA |
| 3,710,924 | 1/1973 | Schultz ........................... 198/33 AA |

*Primary Examiner*—Evon C. Blunk
*Assistant Examiner*—Jeffrey V. Nase
*Attorney, Agent, or Firm*—Jon C. Winger

[57] ABSTRACT

A rotary article orienting and feeder apparatus for orienting and feeding workpieces to subsequent workstations. The feeder apparatus includes a drive shaft rotatably driven about its longitudinal axis by an electric motor, an inner rotating disc coaxially disposed and connected to the drive shaft for rotation therewith, an outer disc disposed at a predetermined angle to the drive shaft and connected thereto for rotation therewith, and a ball and socket mounting for adjustably orienting the axis of the drive shaft at various angles to the vertical.

13 Claims, 6 Drawing Figures

ROTARY FEEDER APPARATUS

BACKGROUND OF THE INVENTION

1. Field of the Invention

The present invention relates to the field of art encompassing power-driven devices that properly arrange and feed articles to subsequent work stations. In particular, the invention pertains to a novel rotary orienting and feeding apparatus.

2. Description of the Prior Art

There are a number of prior art rotary feeder devices for properly orienting and feeding workpieces to subsequent work stations.

These prior art rotary feeders are generally comple in structure and the orientation of the rotating member is fixed with respect to the vertical.

Further, no prior art device of which I am aware is capable of properly orienting and feeding a cylinderical workpiece having a diameter equal to its length.

The present invention provides a rotating article orienting and feeding device wherein the orientation of the rotating members is adjustable with respect to the vertical, which is of simple construction and which is capable of properly orienting cylinderical workpieces having a diameter equal to its length.

These and other advantages of the present invention will become apparent to one skilled in the art upon reading the following disclosure.

SUMMARY OF THE INVENTION

The present invention provides a rotary article orienting and feeding device which properly orients workpieces for subsequent operations and feeds them to subsequent work stations, and comprises an inner disc member and an outer disc member, both mounted for rotation about their respective axes in different planes disposed at predetermined angles to the horizontal. Both the inner and outer discs are connected to a drive shaft for rotation therewith. The drive shaft is mounted for adjustment to different angles to the vertical. An electric motor is operatively connected to the drive shaft to drive it in rotation about its longitudinal axis.

An outer barrier is disposed about the periphery of the outer disc to prevent workpieces from falling off the top surface of the outer disc.

In one embodiment of the present invention, an inner barrier, generally in the shape of a right circular cylinder, is disposed over, and eccentric to the inner disc. The workpieces to be properly oriented and fed to subsequent workstations are randomly deposited into the area defined by the inner barrier and the top surface of the inner disc. As the inner disc rotates, the workpieces are transfered through the appropriate opening in the inner barrier to the top surface of the outer disc. As the outer disc rotates, the workpieces are transfered to the top surface of the inner disc outside the eccentrically located inner barrier. Properly oriented workpieces are allowed to remain on this surface and as the inner disc rotates, these properly oriented workpieces are carried to a discharge tube which transports them to subsequent work stations.

In another embodiment, particularly suited for properly orienting and feeding cylinderical workpieces having a length equal to the diameter, the inner barrier is concentrically located with respect to the inner disc. Workpieces are randomly deposited onto the top surface of the inner disc. As the inner disc rotates, the workpieces are transfered through an appropriate opening in the inner barrier to the top surface of the outer disc. As the outer disc rotates, the workpieces are transfered through another appropriate opening in the inner barrier to the top surface of the inner disc where properly oriented workpieces assume a position along the concave surface of the inner barrier. The rotating inner disc carriers the properly oriented workpieces to a guide block attached to the concave surface of the inner barrier at a predetermined position therealong which guides the properly oriented workpieces into a discharge tube which inturn transports them to a subsequent work station.

BRIEF DESCRIPTION OF THE DRAWINGS

The present invention will be explained in the following specification and with reference to the drawings in which like numerals refer to like parts throughout the several views, and in which.

DETAILED DESCRIPTION OF THE PREFERRED EMBODIMENTS

Figure 1:
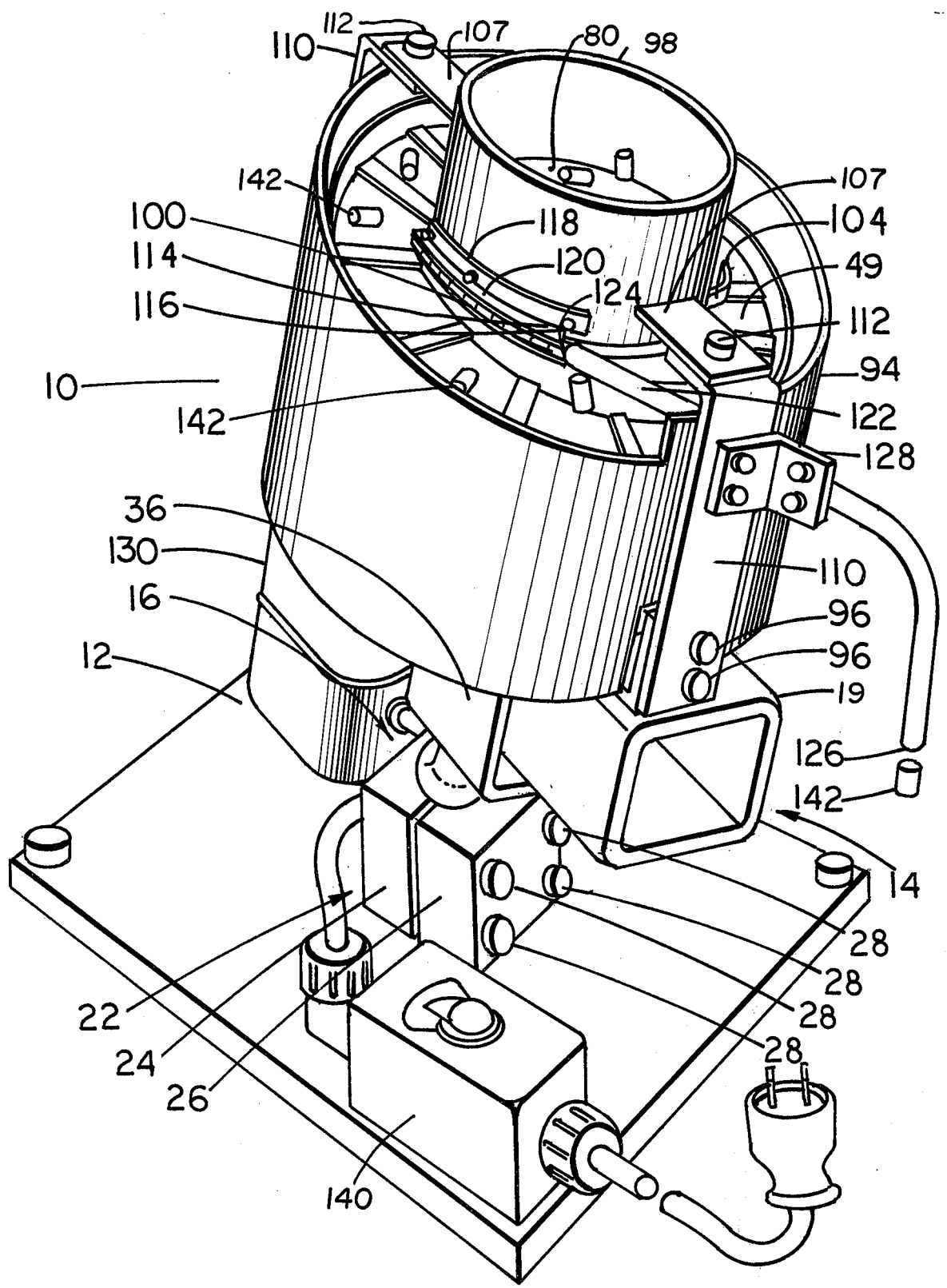
FIG. 1 is a perspective view of one embodiment of the device of the present invention.
Figure 2:
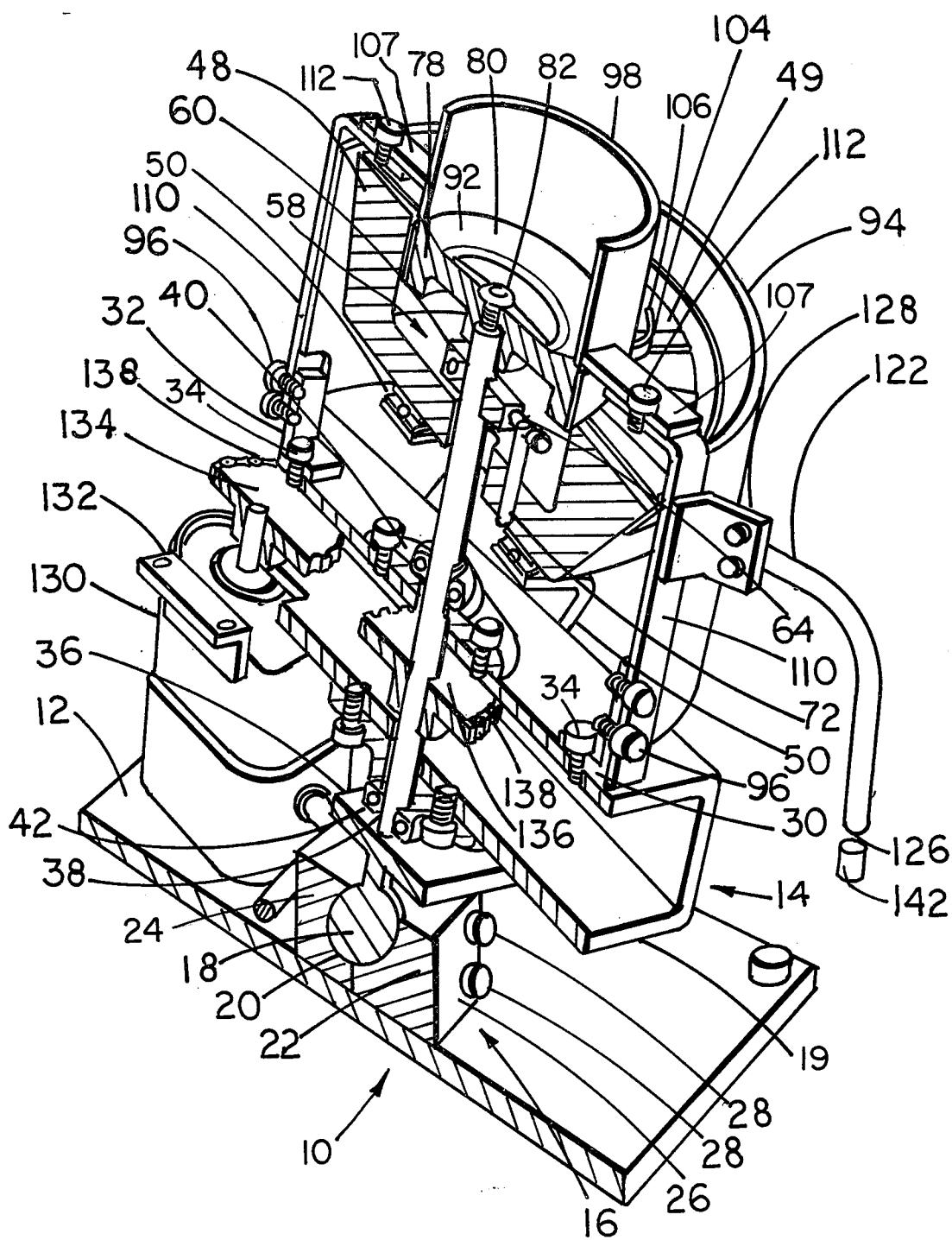
FIG. 2 is a sectional perspective view of the device of FIG. 1.
Figure 4:
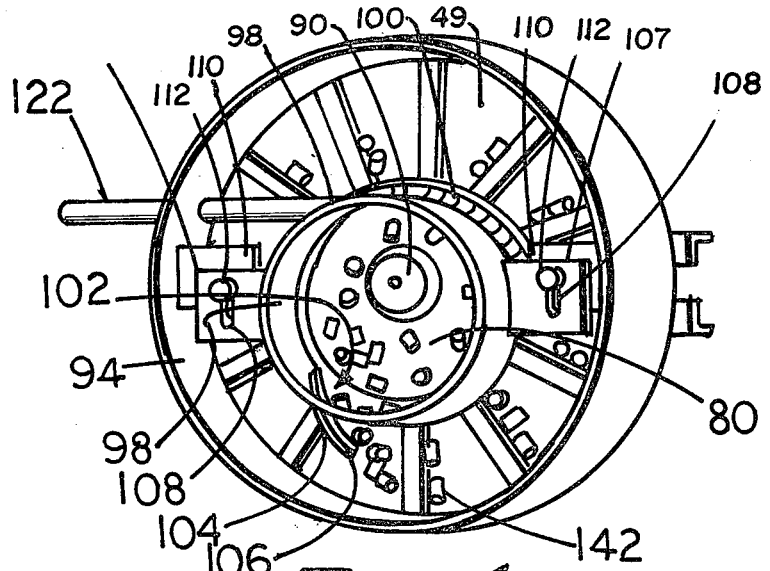
FIG. 4 is a top view of the device of FIG. 1.
Figure 3:
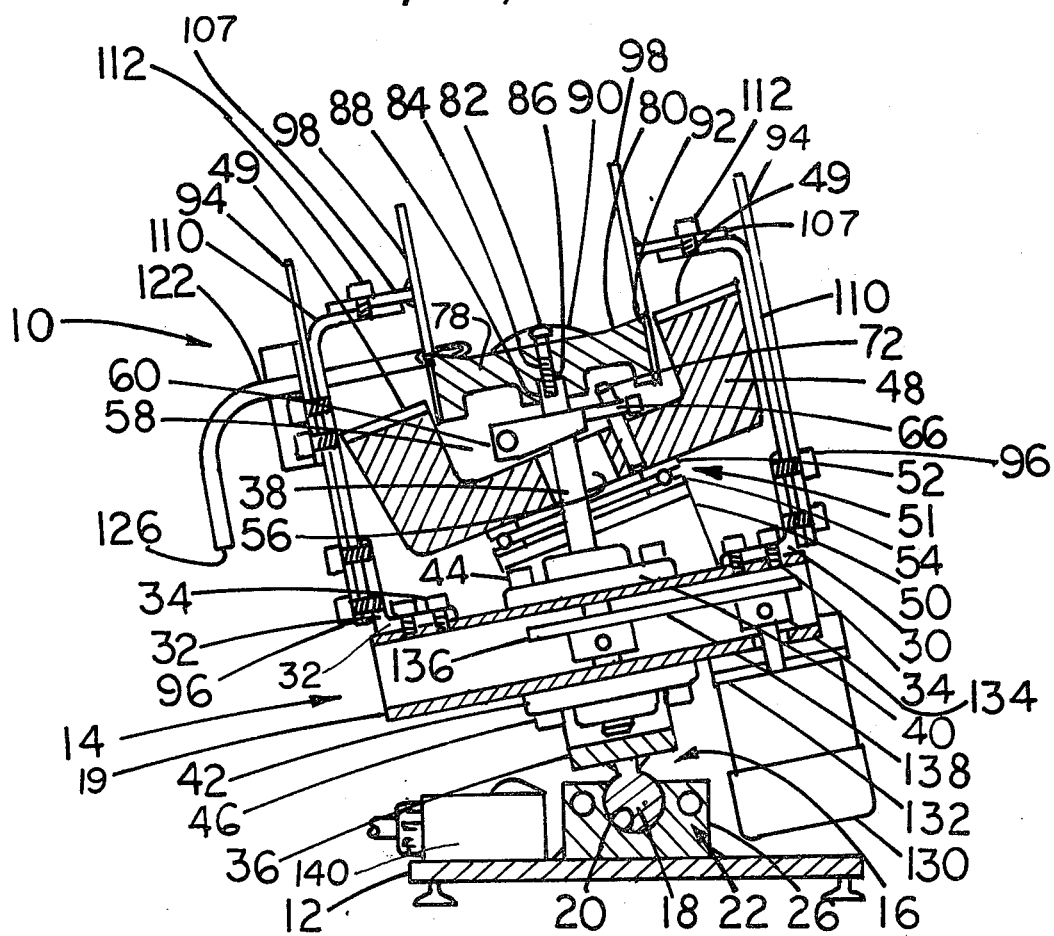
FIG. 3 is a cross-sectional view of the device of FIG. 1.

Referring to the drawings, and in particular to FIGS. 1–3, there is illustrated a rotary orienting and feed apparatus, generally denoted as 10, for properly orienting and feeding workpieces to subsequent work stations. The rotary orienting and feed apparatus 10 comprises a base 12 and a frame 14. As can be best seen in FIGS. 2 and 3, the frame 14 is connected to the base 12 by a ball and socket mounting fixture 16 formed of a ball 18 and a socket 20. The ball 18 is connected to and depends from the bottom of the frame 14 while the socket 20 is formed in a block 22 which is connected to the base 12. This ball and socket mounting fixture allows the frame to be selectively displaced at various angles to the vertical. The block 22 is formed by two separate half blocks 24 and 26 fastened together by bolts 28 extending through bores in the half blocks. In order to selectively change the angle of the frame, the bolts 28 are loosened, thus, allowing the ball 18 to pivot in the socket 20. when the frame is oriented at the desired angle, the bolts 28 are tightened down bringing the two half blocks 24 and 26 closer together thereby applying a force against the ball 18 preventing it from further pivotal motion in the socket 20.

The frame 14 comprises a box beam member 19 having angle irons 30 and 32 connected to its top surface by, for example, bolts 34 so that one leg of each angle iron projects upwardly therefrom. The ball 18 is connected by a bracket 36 to the bottom surface of the box beam.

A drive shaft 38 is rotatably mounted to the box beam member and extends upwardly from the top surface thereof. The shaft 38 is journaled in bearings 40 and 42 which are connected to the top and bottom surfaces, respectively, of the box beam by, for example, bolts 44 and 46, respectively.

An outer disc 48 having a top surface 49 is disposed at an angle to the longitudinal axis of the drive shaft 38 and is rotatably mounted to the frame 14 by means of a bearing support 50 connected to the box beam 19 as by, for example, welding. One race 52 of a thrust bearing 51 is connected to the bottom surface of the outer disc 48, and the other race 54 is connected to the bearing support 50. The outer disc 48 has an aperture 56 at its center to provide a clearance for the passage therethrough of the drive shaft 38. The drive shaft is in driving engagement with the outer disce 48 to rotate the outer disc about its own axis. A device 60 recessed in a pocket 58 in the outer disc 48 provides this driving engagement.

Figure 5:
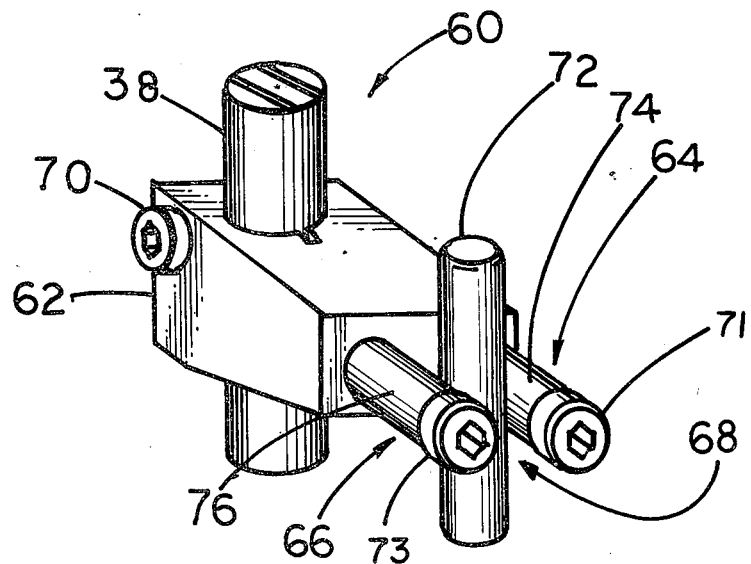
FIG. 5 is a perspective view of a drive connection of the device of FIG. 1.

As can be best seen in FIG. 5, the device 60 comprises a drive member 62 removably connected to the drive shaft 38 for rotation therewith. The drive member 62 includes a fork member with two tines 64 and 66 projecting outwardly therefrom and defining an open ended elongated slot 68 projecting radially outwardly of the drive shaft 38. The drive member 62 is securely connected to the drive shaft by a bolt 70 which extends through an appropriate horizontally disposed bore in the drive member 62. A post member 72 is connected to the outer disc 48 and projects upwardly into the elongated slot 68 between the tines 64 and 66 of the drive member 62. As the device 60 is rotatably driven by the drive shaft, one of the walls of the elongated slot contacts the post member 72 and, thus, causes the outer disc 48 to rotate about its axis on the bearing 51. As the outer disc 48 rotates, the post member 72 moves axially of the slot 68 for the reason that the distance of the post 72 from the drive shaft 38 varies due to the angular relationship of the outer disc 48 to the longitudinal axis of the drive shaft 38.

Referring once again to FIG. 5, there can be best seen the unique construction of the tines 64 and 66 of the device 60. The tines are socket head bolts 71 and 73 threadably received in threaded bores in the drive member 62. Cylinderically shaped collars 74 and 76 are slidably received over the body of the bolts 71 and 73. As the outer disc 48 rotates about its axis, the post member also moves up and down with respect to the tines 64 and 66 of the device 60 and rubs against them. This rubbing action could cause undue wear of the tines and post. However, as the post moves up and down with respect to the tines, the post 72 causes the collars 74 and 76 to rotate on the bolts 71 and 73, thus, eliminating much of the wear to the tines.

An inner disc 78 having a top surface 80 is coaxially disposed with the drive shaft 38 and is connected to the top end of the drive shaft for rotation therewith. The inner disc 78 is connected to the drive shaft by a bolt 82 which extends through an axially disposed bore 84 in the inner disc and is threadably received in a threaded bore 86 axially disposed in the top end of the drive shaft. To aid in locating the inner disc 78 on the drive shaft 38, and to prevent wobble of the inner disc 78, the top end of the drive shaft is received in an aperture 88 in the inner disc 78. A cap 90 is located over the head of the bolt 82 to prevent the workpieces from collecting centrally about the bolt head. Further, the top surface 80 of the inner disc 78 has an inclined portion 92 proximate the periphery thereof sloping toward the center of the inner disc 78. This incline is preferably approximately 7°.

A first barrier 94 is disposed around the periphery of the outer disc 48. This first barier is connected to the upwardly extending legs of the angle irons 30 and 32 by, for example, bolts 96.

As can best be seen in FIGS. 1, 2, 3 and 4, a second barrier 98 is disposed above the top surface 80 of the inner disc 78 eccentric with the inner disc 78. Preferrably, the second barrier 98 is formed as a right circular cylinder, although other arcuate shapes can also be used. This eccentric disposition of the second barrier provides a portion 100 of the inner disc 78 to lie outside of, or to the convex side of the second barrier. The second barrier has an opening 102 therein to allow workpieces to exit from the top surface 80 inside the second barrier 98 to the top surface 49 of the outer disc 48. The second barrier includes a curved finger 104 connected at one of its ends to the second barrier adjacent the opening 102. The finger 104 has a free end 106 spaced outwardly from the opening 102. The finger 104 functions as a guide for workpieces as they exit from the top surface 80 of the inner disc interior to the second barrier to the top surface 49 of the outer disc 49.

The second barrier 98 has a pair of flanges 107 extending in opposite directions therefrom. Each of these flanges has an elongated slot 108 therein. A pair of L-shaped brackets 110 are each connected at one of the legs to the upwardly projecting legs of the angle irons 30 and 32 by, for example, the bolts 96. The other leg of each L-shaped bracket 110 extends horizontally inwardly over the top of the apparatus 10. A bolt 112 extends through each slot 108 into the threaded bore in the horizontal leg of each bracket 110. The second barrier 98 is removed from the apparatus 10 by removing the bolts 112, and the eccentricity of the second barrier 98 is adjusted by sliding the barrier past the bolts 112.

A guide member 114 (see FIG. 1) is adjustably connected to the convex surface of the second barrier 98 over the portion 100 of the inner disc 78 by, for example, screws 116. The guide member comprises a flange 118 which abuts the convex surface of the second barrier 98 and a generally horizontal flange 120 extending outwardly from the flange 118. The horizontal flange 120 is spaced above the top surface 80 of the portion 100 of the inner disc 98 a distance approximately equal to the vertical dimension of a properly oriented workpiece.

A workpiece discharge means, such as a discharge tube 122 is operatively associated with the portion 100 of the inner disc 78 adjacent the top surface 80 thereof. The inlet end 124 of the tube 122 is disposed at the top surface 80 in the portion 100. Further, the longitudinal axis of the discharge tube at the inlet end 124 is generally tangentially disposed to the second barrier 98. The discharge tube leads away from the apparatus 10 and has an outlet end 126 from which to discharge workpieces remote from the appparatus 10. The discharge tube is connected to the apparatus by a bracket 128.

The drive shaft 38 is rotatably driven by an electric motor 130 connected to the apparatus 10 by mounting brackets 132. A driving member, such as a gear sprocket 134 is connected to the output shaft of the electric motor 130 for rotation therewith. A driven member, such as a gear sprocket 136 is connected to the drive shaft for rotation therewith. The driven member 136 is operatively connected to the driving member 134 by, for example, a chain 138. It should be obvious at this point that the driving member 134 and driven member 136 could be belt pulleys and the operative connection therebetween a belt. Alternatively, the driving and driven members coud be a pair of gears in mesh with each other.

A reostat 140 can be used to vary the rotational speed of the drive shaft 38 to suit various feeding conditions.

In operation, workpieces 142 to be oriented for subsequent operations and to be fed to subsequent work stations, are randomly placed interior to the second barrier 98 on the top surface 80 of the inner disc 78 from above the apparatus 10. The workpieces 142 fall through the exit opening 102 in the second barrier 98, thus, exiting from the interior of the second barrier to the top surface of the outer disc 48. The first barrier 94 prevents the workpieces 142 from falling off the apparatus 10. As the outer disc 48 rotates, it carries the workpieces on its top surface 49 to the high or elevated side of the angled outer disc. At this point, the work pieces slide down the inclined top surface 49 and onto the portion 100 of the inner disc 78. As the inner disc rotates, a random number of workpieces will properly orient themselves along the convex surface of the second barrier 98 on the portion 100. The inclined peripheral portion 92 of the inner disc 78 helps to properly orient the workpieces 142. As the inner disc 78 continues to rotate, the portion 100 thereof carries workpieces 142 to the guide member 114. The guide member 114 knocks some of the dis-oriented workpieces off the portion 100 of the inner disc 78. As the inner disc 78 continues to rotate, the portion 100 thereof carries workpieces under the guide member 114 to the inlet or receiving end 124 of the discharge tube 122. The receiving end of the discharge tube receives only properly oriented workpieces, therefore, improperly or disoriented workpieces are knocked off the portion 100 of the inner disc. Those improperly oriented workpieces either not originally accepted on the portion 100, or knocked off are recirculated by the outer disc 48 back to the elevated side thereof, and the above-described sequence of events is repeated until all of the workpieces 142 have been properly oriented and fed out of the feeder apparatus 10 to subsequent work stations.

Some cylinderically shaped workpieces are extremely difficult to orient properly. One such cylinderically shaped workpiece which is particularly difficult to orient properly is one which has a longitudinal length equal to its diameter. In order to properly orient a cylinderical workpiece having this configuration, the second barrier 98 is replaced by a third barrier 143 (See FIG. 6). The third barrier 143 is generally cylindrically shaped and is mounted above the top surface 80 of the inner disc 78 concentric to the inner disc. The third barrier comprises a first opening 145 to allow workpieces to enter therein and rest upon the top surface 80 of the inner disc 78, and a second opening 144 disposed generally opposite the first opening 145 to allow workpieces to exit therefrom to the top surface 49 of the outer disc 48. The third barrier 143 further comprises a spiral wall 146 disposed interior to the third barrier 143. The spiral wall 146 is connected at one of its ends 148 to the concave surface of the third barrier proximate the first opening 145, and is connected at its other end 150 to the concave surface of the third barrier proximate the second opening such that the spiral wall projects inwardly of the third barrier 143 and spans the distances between the adjacent edges of the first opening and second opening of the third barrier.

The spiral wall 146 comprises a first opening 152 therein proximate the first opening 145 of the third barrier and a second opening 154 therein proximate the second opening 144 of the third barrier. The first opening 152 in the spiral wall 146 allows workpieces to enter the area defined by the spiral wall 146 and the third barrier 143 from the top surface 80 of the inner disc 78 outside of this area. The second opening 154 allows workpieces to exit from this area to the top surface 49 of the outer disc 48.

Further, the spiral wall 146 has an arcuately shaped finger 156 connected at one of its ends to the spiral wall adjacent the first opening 152 and having its other end 158 a free end extending into the interior of the area defined by the spiral wall 146 and the third barrier 143 and extending in spaced relationship across a portion of the first opening 152. This finger 156 serves to help guide workpieces through the first opening 152.

The spiral wall 146 has another finger 160 connected at one of its ends to the spiral wall 146 adjacent that edge of the second opening 154 most remotely located from the third barrier 143. The finger 160 is substantially straight and has as its other end a free end 162 extending generally toward the second opening 144 in the third barrier and in spaced relationship across a portion of the second opening 154 in the spiral wall 146. This finger 160 serves to help guide workpieces from the top surface 80 of the inner disc 78 interior to the area defined by the spiral wall 146 and the third barrier 143 through the second opening 144 in the third barrier 143 to the top surface 49 of the outer disc 48.

A guide block 164 is connected to the concave surface of the third barrier 143 generally opposite the spiral wall 146. The guide block 164 comprises a generally sinusoidally shaped surface 166 and a flange 168 connected to one end of the block and disposed generally perpendicularly to the surface 166 at that end thereof to which it is connected. The sinusoidal surface 166 blends with, or merges with the concave surface of the third barrier at its end 170 opposite the end thereof to which flange 168 is connected. The surface 166 makes a smooth transition from concavely facing inwardly of the barrier 143 to convexly facing inwardly of the barrier 143 progressing in the direction of rotation of the inner disc 78.

A discharge tube 172 has its receiving end 174 connected to the flange 168 and is coaxially disposed with an aperture in the flange 168. The outlet end 176 of the tube is disposed at a subsequent work station.

Preferably, the first opening 145 is disposed to the elevated side of the outer disc and the second opening 144 is disposed to the lower side of the outer disc, while the guide block 164 is located along the side of the third barrier traversing between the elevated side and the lower side of the outer disc 48.

Figure 6:
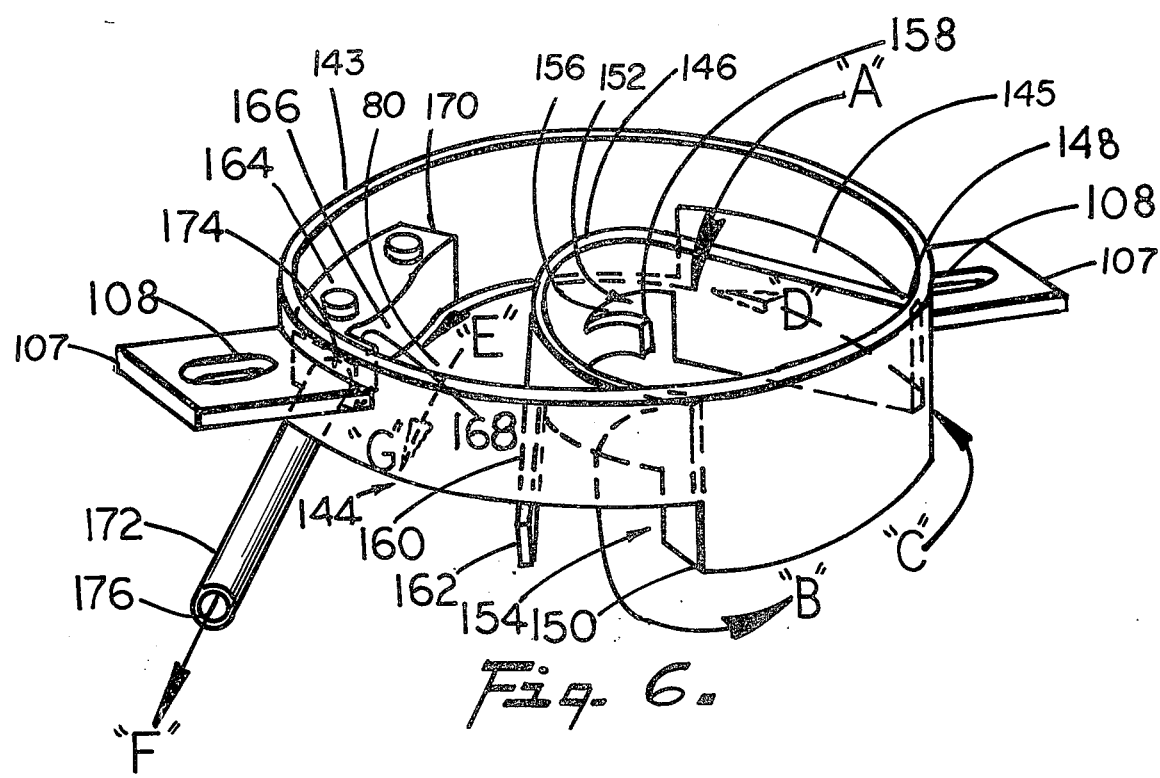
FIG. 6 is a perspective view of one embodiment of an inner barrier member used in the device of FIG. 1.

The operation of the apparatus 10 with the third barrier 143 mounted thereon in place of the second barrier 98 can best be visualized by reference to FIG. 6, the path of the workpieces being indicated therein by flow arrows. The workpieces to be oriented and fed to subsequent work stations are randomly placed into the area defined by the generally concave side of the spiral wall 146 and the third barrier 143 onto the top surface 80 of the inner disc 78 from above the apparatus 10 as indicated by flow arrow "A." As the inner disc 78 rotates, the workpieces fall through the second opening 154 in the spiral wall 146 and are guided by the finger 160 to the top surface 49 of the outer disc 48 as indicated by the flow arrow "B." The rotating outer disc 48 carries the workpieces up to the elevated side thereof to a location generally opposite the first opening 145 in the third barrier 143 as indicated by the flow arrow "C." Next, the workpieces slide on the top surface 49 toward and through the first opening 145 in the third barrier 143 and onto the top surface 80 of the inner disc 78 as indicated by the flow arrow "D." As the inner disc 78 rotates, it forces some of the workpieces against the concave surface of the third barrier 143 by centrifugal force and gravity where a random number of the workpieces will properly orient themselfs along the concave thereof such that they will be inlongitudinal abuting relationship thereto. As the inner disc 78 rotates, it will cause each of the properly oriented workpieces to rotate about their longitudinal axis. The downward slop to the inner disc 78 plus the longitudinal rotation of the properly oriented workpieces cause them to progress along the surface 166 of the guide block 164 toward the receiving end 174 of the discharge tube 172 as indicated by the flow arrow "E." The conves portion of the surface 166 serves to axially orient the longitudinal axis of properly oriented workpieces with the longitudinal axis of the discharge tube 172 at its receiving end 174 such that the longitudinal axis of the properly oriented workpieces are substantially coaxial with the longitudinal axis of the dischare tube at the receiving end 174. The properly oriented workpieces, thus, slide through the dischare tube 172 and exit therefrom at the outlet end 176 thereof as indicated by flow arrow "F." Those workpieces which are not properly oriented for passage through the discharge tube 172 slide on the top surface 80 of the inner disc 78 downwardly toward the second opening 144 and through the second opening onto the top surface 49 of the rotating disc 48 as indicated by the flow arrow "G." These improperly oriented workpieces are recirculated along with newly deposited workpieces on the outer disc 48, and the above-described sequence of events is repeated until all of the workpieces have been fed out of the feeder apparatus 10 to subsequent work stations.

As various possible embodiments might be made of the present invention, and various changes and modifications might be made in the above described embodiments, it is to be understood that all matter herein described and shown is to be interpreted as illustrative and not in a limiting sense.

I claim:

1. A rotary feeder apparatus to orient workpieces for subsequent operations to be performed on them and to feed the workpieces to subsequent work stations, comprising:

a drive shaft rotatably mounted in the apparatus;
   an outer disc rotatably mounted in the apparatus, the axis of said outer disc being disposed at a predetermined angle to the longitudinal axis of said drive shaft,
   said outer disc being in driving engagement with said drive shaft for rotation therewith;
   an inner disc coaxially disposed and connected to said drive shaft for rotation therewith;
   a first barrier disposed around the periphery of said outer disc to project above the top surface of said outer disc;
   a generally arcuately shaped second barrier disposed above the top surface of said inner disc and eccentric with said inner disc;
   a workpiece discharge means operatively associated with the portion of said inner disc disposed to the convex side of said eccentrically disposed second barrier; and
   means for rotating said drive shaft to rotate said inner disc and said outer disc.

2. A rotary feeder apparatus as defined in claim 1, wherein said second barrier comprises;
   a generally cylinderical shape; and
   an aperture therein to allow workpieces disposed therein to exit from the top surface of said inner disc to the top surface of said outer disc.

3. A rotary feeder apparatus as defined in claim 1, wherein said inner disc comprises an inclined top surface proximate the periphery of said inner disc, said incline sloping generally toward the center of said inner disc.

4. A rotary feeder apparatus as defined in claim 1, further comprising means for selectively changing the angle of the longitudinal axis of said drive shaft relative to the vertical.

5. A rotary feeder apparatus as defined in claim 1, wherein said driving engagement of said outer disc to said drive shaft comprises:
   a drive member removably connected to said drive shaft for rotation therwith, said drive member having an elongated slot projecting radially outwardly from said shaft; and
   a post member connected to and projecting from said outer disc to engage in said elongated slot in said driving member,
   as said shaft rotates said drive member, said post member contacts a wall of sid slot which causes said outer disc to rotate with said shaft, and allows said pin member to move axially of said slot as the distance of said pin from the axis of said shaft changes due to the angular relationship of said outer disc to said shaft.

6. A rotary feeder apparatus as defined in claim 5, wherein said drive member comprises a fork member with two tines, said slot being defined between said tines and having an open end.

7. A rotary feeder apparatus as defined in claim 1, further comprising:
   a base;
   a frame;
   said drive shaft is rotatably mounted in said frame; and
   pivot mounting means disposed between and interconnecting said base and said frame to allow said frame, and therefore said shaft, to be selectively displaced at selected angles to the vertical.

8. A rotary feeder apparatus as defined in claim 7, wherein;
   said first barrier is connected to and supported by said frame; and
   said second barrier is adjustably connected to and supported by said frame.

9. A rotary feeder apparatus as defined in claim 1, further comprising a guide member adjustably connected to the convex side of said second barrier over said portion of said inner disc disposed to the convex side of said second barrier, said guide member being spaced above said inner disc to prevent improperly oriented workpieces from reaching said workpiece discharge means.

10. A rotary feeder apparatus as defined in claim 7, wherein said pivot mounting means comprises a ball and socket fixture.

11. A rotary feeder apparatus to orient work pieces for subsequent operations to be performed on them and to feed the work pieces to subsequent work stations, comprising:
- a drive shaft rotatably mounted in the apparatus;
- an outer disc rotatably mounted in the apparatus, the axis of said outer disc being disposed at a predetermined angle to the longitudinal axis of said drive shaft;
- said outer disc being in driving engagement with said drive shaft for rotation therewith;
- an inner disc coaxially disposed and connected to said drive shaft for rotation therewith;
- a first barrier disposed around the periphery of said outer disc to project above the top surface of said outer disc;
- a generally accurately shaped second barrier disposed above the top surface of said inner disc and eccentric with said inner disc;
- a work piece discharge means operatively associated with the portion of said inner disc disposed to the convex side of said eccentrically disposed second barrier; and,
- means for rotating said drive shaft to rotate said inner disc and said outer disc.

12. A rotary feeder apparatus as defined in claim 11, wherein said arcuately shaped third barrier further comprises:
- a spiral wall disposed to the concave side of said third barrier,
- said spiral wall being connected to said third barrier between said first opening and said second opening;
- said spiral wall having a first opening therethrough in proximity to said first opening through said third barrier to allow workpieces to enter the area defined by said third barrier and said spiral wall;
- said spiral wass having a second opening therethrough in proximity to said second opening through said third barrier to allow workpieces to exit from the area defined by said third and said spiral wall to the top surface of said outer disc;
- a guide block disposed at a predetermined location along the concave surface of said third barrier generally opposite said spiral wall, said guide block having a generally sinucoidally shaped surface facing inwardly of said inner disc; and
- said workpiece discharge means being operatively associated with said guide block at one end thereof.

13. A rotary feeder apparatus as defined in claim 12, further comprising means for selectively changing the angle of the longitudinal axis of said drive shaft relative to the vertical.

* * * * *